United States Patent

Macey

[15] 3,646,324

[45] Feb. 29, 1972

[54] INFORMATION-PROCESSING SYSTEM

[72] Inventor: Frank G. Macey, Shrewsbury, Mass.

[73] Assignee: GTE Sylvania Incorporated

[22] Filed: Nov. 10, 1970

[21] Appl. No.: 88,318

[52] U.S. Cl. ................................235/61.11 E, 340/146.3 K

[51] Int. Cl. ..........................................................G06k 7/10

[58] Field of Search..........235/61.11 E; 250/219 D, 219 DC; 340/146.3 K

[56] References Cited

UNITED STATES PATENTS 3,225,177 12/1965 Stites et al.......................340/146.3 K 3,560,751 2/1971 Buettner et al.................235/61.11 E

*Primary Examiner*—Daryl W. Cook

*Attorney*—Norman J. O'Malley, Elmer J. Nealon and Peter Xiarhos

[57] ABSTRACT

An optical label-reading system for reading coded retroreflective labels affixed to railway vehicles. The labels may be clean, that is, have little or no foreign matter (e.g., ore dust or dirt) thereon, or dirty, that is have a significant amount of foreign matter thereon. In accordance with the invention, each label, whether clean or dirty, is scanned twice by a scanning unit whereby two sets of identical signals representative of the information encoded in the label are produced in succession by the scanning unit. The two sets of signals are applied in succession to a dual-gain amplifier circuit. The dual-gain amplifier circuit has two values of gain, a first value corresponding to a "clean-label" condition and a second, larger value corresponding to a "dirty-label" condition, and is adapted to be switched alternately between its two values of gain during successive scanning operations. The two values of gain are selected such that signals derived from a clean label and amplified by the first value of gain, or signals derived from a dirty label and amplified by the second value of gain, have a resulting amplitude which is within the dynamic range of processing circuitry employed to process the amplified signals produced by the dual-gain amplifier circuit.

Each of the two identical successive sets of signals derived from a label, whether clean or dirty, is amplified by a different one of the two values of gain thereby causing two sets of amplified output signals to be produced in succession by the dual-gain amplifier circuit. One of the two sets of amplified signals, by virtue of the values of gain selected for the dual-gain amplifier circuit, clearly has an amplitude falling within the dynamic range of the processing circuitry and is correctly processed by the processing circuitry. The other set of amplified signals may or may not have an amplitude falling within the dynamic range of the processing circuitry as determined by the particular condition or degree of cleanliness of the label. If the amplitude of the second set of amplified signals falls within the dynamic range of the processing circuitry, this set of signals is also correctly processed by the processing circuitry; otherwise, the set of signals is rejected by logic circuitry and parity checking circuitry provided in the processing circuitry.

20 Claims, 4 Drawing Figures

INVENTOR.
FRANK G. MACEY
BY
Peter Xiarhos

INVENTOR.
FRANK G. MACEY

BY Peter Xiarhos

INVENTOR.
FRANK G. MACEY
BY
Peter Xiarhos

INVENTOR.
FRANK G. MACEY

BY

INFORMATION-PROCESSING SYSTEM

BACKGROUND OF THE INVENTION

The present invention relates to a system for processing information encoded in a label and, more particularly, to a label-reading system for reading coded labels affixed to objects such as railway vehicles.

Various systems and apparatus are known for reading coded labels affixed to vehicles or to other objects presented to a label-reading station. An exemplary system for reading coded identification labels on railway vehicles, for example, railroad cars, is described in detail in U.S. Pat. No. 3,225,177 to Stites et al., assigned to the same assignee as the present application. In the above-mentioned patented system, a railway vehicle is provided with a vertically oriented retroreflective label including, in a vertical array, a plurality of rectangular retroreflective orange, blue, and white stripes, and nonretroreflective black stripes. The stripes of the four colors are arranged in a plurality of selected paired combinations, in accordance with a two-position base-four code format, to represent the identity or other information pertaining to the vehicle. Distinguishable coded START and STOP stripe-pairs, representing START and STOP control words, respectively, are also provided at opposite ends of the array of stripe-pairs to respectively initiate and terminate processing of the data content of the label. As the labeled vehicle passes the label-reading station, the coded data is sensed from the label by means of an optical scanning apparatus which vertically scans the label from bottom to top with an incident beam of light. The light reflected from the various retroreflective code stripes of the label is returned along the path of the incident light and applied to suitable translation and decoding apparatus for further processing.

The above-described patented system has functioned satisfactorily to sense data from coded retroreflective labels affixed to vehicles such as railroad cars and to process such sensed data. However, in certain applications of the above-described system, for example, in ore-hauling applications employing labeled, open-top gondola or hopper ore cars, it is possible for ore dust, dirt, and other foreign matter to deposit fortuitously on many of the labels on the ore cars, in a generally uniform fashion, and to attenuate, by an amount in accordance with the amount of foreign matter, the incident light directed thereon by the optical scanning apparatus. As a result, the signals produced by the optical scanning apparatus as a consequence of scanning such labels have an amplitude which is significantly less than the amplitude of signals produced as a consequence of scanning labels on which little or no foreign matter is present and below a predetermined minimum input level of processing circuitry normally required to process the signals produced by the optical scanning apparatus. Since the processing circuitry is adapted to process correctly only those signals having an amplitude exceeding the predetermined minimum input level, a false reading, or no reading at all, may occur when the processing of signals below the minimum input level is attempted. As a solution to the above problem, it has been proposed to increase the gain of the system by an appropriate amount such that the signals derived as a result of scanning labels on which a significant amount of foreign matter is present are amplified to a level exceeding the minimum input level of the processing circuitry thereby permitting correct processing of these signals. However, when this is done, the signals derived as a result of scanning clean labels on which little or no foreign matter is present are also amplified and often have a resulting amplitude exceeding a predetermined maximum input level of the processing circuitry. As a result, these labels on which little or no foreign matter is present may be incorrectly read.

BRIEF SUMMARY OF THE INVENTION

Briefly, in accordance with the present invention, a system is provided for processing information encoded in a label presented to a label-reading location. In accordance with the invention, an information-sensing means is provided which operates to sense the information encoded in a label and to produce output signals representative of the information encoded in the label. The output signals produced by the information-sensing means are amplified in a control means by a first value of gain corresponding to a predetermined first condition of cleanliness of a label or by a second value of gain corresponding to a predetermined second condition of cleanliness of a label. As a result, amplified output signals are produced by the control means having a first amplitude or a second amplitude. By way of example, the predetermined first condition of cleanliness of a label may be a condition in which little or no foreign matter is present on a label and the predetermined second condition of cleanliness of a label may be a condition in which a significant amount of foreign matter is present on a label.

The amplified output signals of the first amplitude or second amplitude produced by the control means are examined by a signal processing means to determine whether they satisfy certain preestablished criteria for valid label-derived signals. If the amplified output signals satisfy the preestablished criteria, the signal processing means operates to produce and apply output signals related to the amplified output signals to an output connection.

BRIEF DESCRIPTION OF THE DRAWING

The invention is more fully described in the following detailed description, taken in conjunction with the accompanying drawing in which.

GENERAL DESCRIPTION OF THE INVENTION—FIG. 1.

Figure 1:
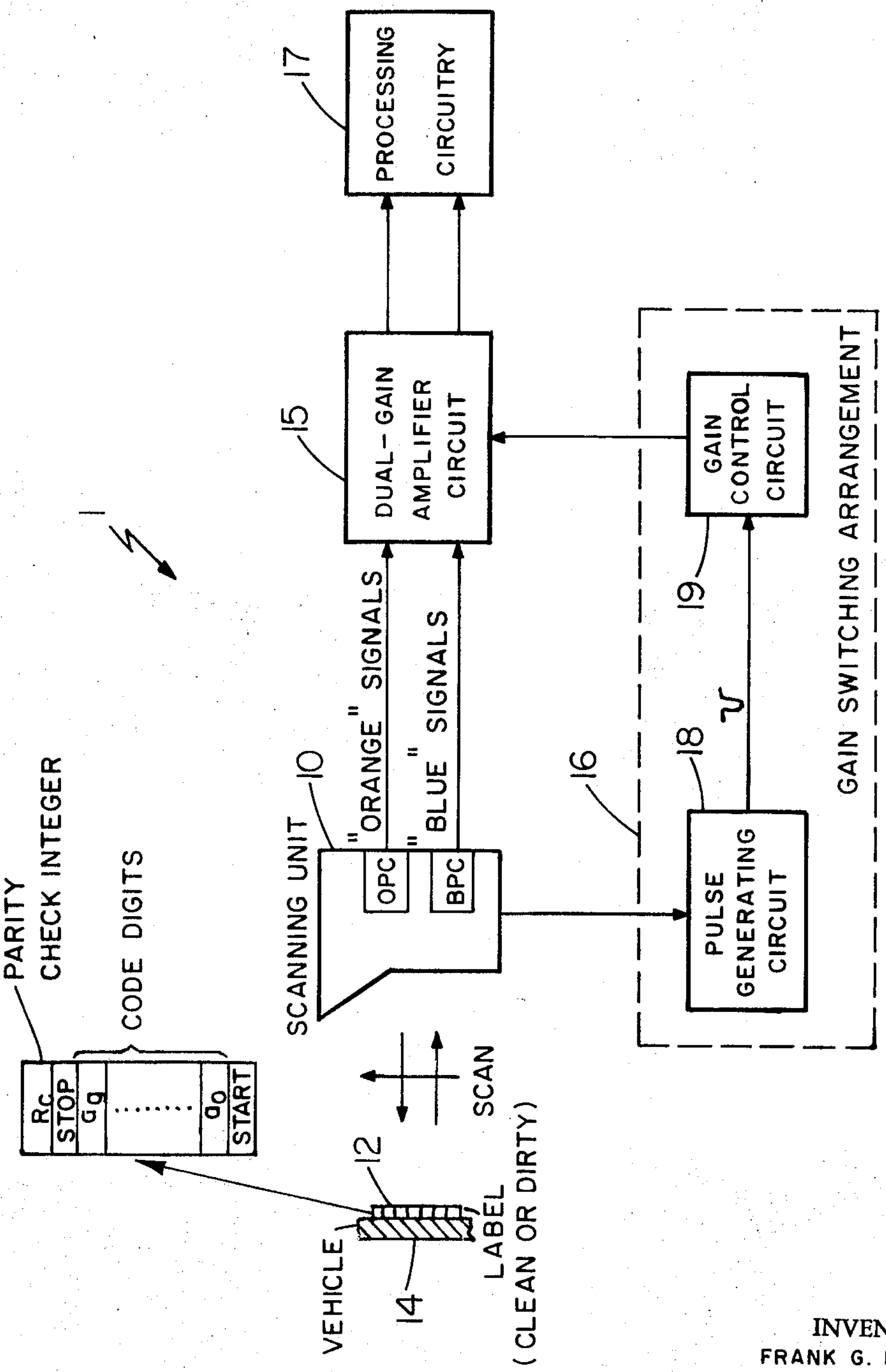
FIG. 1 is a diagrammatic representation in block diagram form of an optical label reading system including a gain switching arrangement and a dual-gain amplifier circuit in accordance with the present invention.

Referring to FIG. 1, there is shown in block diagram form an optical label reading system 1 in accordance with the present invention. As shown in FIG. 1, the optical label reading system 1 includes a scanning unit 10 for vertically sweeping an incident scanning light beam across a coded label 12 affixed to the side of a vehicle 14 presented to the scanning unit 10. Although the coded label 12 may assume a variety of different forms, it is preferably of a retroreflective type such as described in detail in the aforementioned patent to Stites et al. Briefly, the coded label 12 is fabricated from rectangular orange, blue, and white retroreflective stripes and nonretroreflective black stripes. The orange, blue, and white retroreflective stripes have the capability of reflecting an incident light beam back along the path of incidence while the black stripes effectively lack such a capability of retroreflection. The label 12 is suitably coded, for example, in a two-position base-four code format, by various two-stripe combinations of the retroreflective orange, blue, and white stripes and the nonretroreflective black stripes, to represent in a sequential format blocks of information including a START control word, a plurality of code digits $a_0 \ldots a_9$, each having a decimal value selected from 0...9, a STOP control word, and a parity check integer $R_C$. The above-described format of the coded label information is shown in a blown-up pictorial form in FIG. 1. The rectangular label stripes are mounted in a vertical succession, each stripe having a horizontal orientation, on the side of the vehicle 14. The decimal value of the parity check integer $R_C$ corresponding to the particular values selected for the digits $a_0...a_9$ is preferably determined in accordance with a well-known system of parity designated the "powers-of-two-modulo-11" system of parity. Such a system of parity, and the manner in which it is employed to derive a value for the parity check integer $R_C$, is described in detail in U.S. Pat. No. 3,524,163, to Weiss, also assigned to the same assignee as the present application.

Light reflected from the various stripes of the label 12 in response to being scanned by the incident scanning beam produced by the scanning unit 10 is returned to an received by the scanning unit 10 and selectively converted thereby into coded electrical signals representative of the information encoded in the label 12. More particularly, an "orange-responsive" photocell OPC is provided in the scanning unit 10 for producing an electrical output signal ("ORANGE" signal) in response to light reflected from either an orange stripe or a white stripe of the label 12 (white reflected light including an "orange" component), and a "blue-responsive" photocell BPC is provided in the scanning unit 10 for producing an electrical output signal ("BLUE" signal) in response to light reflected from either a blue stripe or a white stripe of the label 12 (white reflected light including a "blue" component). Thus, both photocells OPC and BPC are energized simultaneously to produce respective electrical output signals in response to light reflected from a white stripe. Neither of the photocells OPC and BPC is energized to produce an electrical output signal when a black stripe is scanned inasmuch, as previously stated, the black stripes are nonretroreflective.

For reasons discussed previously in the section entitled "-Background of the Invention," the amplitude of the various electrical output signals produced by the scanning unit 10 as a result of scanning the coded label 12 depends on the amount of light-attenuating foreign matter, if any, on the label 12. For example, if the label 12 is essentially "clean," that is, it has little or no light-attenuating foreign matter thereon, the scanning unit 10 produces electrical output signals of a maximum amplitude; if the label 12 is "dirty," that is, it has a significant amount of light-attenuating foreign matter thereon, the scanning unit 10 produces electrical output signals having an amplitude less than the aforementioned maximum amplitude by an amount directly proportional to the amount of light-attenuating foreign matter on the label 12.

The various coded electrical output signals ("ORANGE" and "BLUE" signals) produced by the photocells OPC and BPC as a result of scanning the coded label 12, and attenuated or not in accordance with the extent of foreign matter present on the label 12, are applied to a dual-gain amplifier circuit 15. The dual-gain amplifier circuit 15 has two different values of gain. A first of the two values of gain is selected such that signals derived from a "clean" label and amplified in the dual-gain amplifier circuit 15 by the first value of gain have a resulting amplitude which falls within certain minimum and maximum input operating levels (that is, dynamic range) or processing circuitry 17 employed to process the output signals produced by the dual-gain amplifier circuit 15. Similarly, the second value of gain of the dual-gain amplifier circuit 15 is selected such that signals derived from a "dirty" label and amplified in the dual-gain amplifier circuit 15 by the second value of gain have a resulting amplitude which also falls within the minimum and maximum input operating levels (that is, dynamic range) of the processing circuitry 17. Due to the fact that the attenuation of incident light is greater for a "dirty" label than for a "clean" label, the second value of gain is selected to be greater than the first value of gain to compensate for the differences in attenuation.

As will be described in detail hereinafter, the operation of the dual-gain amplifier circuit 15 is controlled by a gain switching arrangement 16 which, as shown in FIG. 1, comprises a pulse generating circuit 18 coupled to the scanning unit 10 and a gain control circuit 19 coupled to the pulse generating circuit 18 and to the dual-gain amplifier circuit 15. The pulse generating circuit 18 operates during each scanning operation of the scanning unit 10 to generate a trigger pulse which is applied to the gain control circuit 19. The gain control circuit 19 operates in response to the trigger pulse to produce an output condition for causing the dual-gain amplifier circuit 15 to amplify signals received thereby from the scanning unit 10 by either the first value of gain or the second value of gain.

The dual-gain amplifier circuit 15, as employed in the present invention, is incapable of distinguishing between signals derived from clean labels and signals derived from dirty labels so as to be able to selectively amplify the various signals received thereby by the appropriate corresponding value of gain. As a result, instead of amplifying signals derived from a clean label by the corresponding first (smaller) value of gain, or amplifying signals derived from a dirty label by the corresponding second (larger) value of gain, as would be most desirable, it is possible for the dual-gain amplifier circuit 15 to amplify signals derived from a clean label by the second (larger) value of gain and to amplify signals derived from a dirty label by the first (smaller) value of gain. When either of the above situations occurs, output signals are produced by the dual-gain amplifier circuit 15 having an amplitude which, depending on the condition of cleanliness of the label, may be either less than the minimum input threshold operating level, or greater than the maximum input threshold operating level, of the processing circuitry 17.

In accordance with the present invention, to correct for the above-mentioned problem, two successive scans of each label are made by the scanning unit 10, whereby two successive sets of identical signals are produced by the scanning unit 10, and the two sets of identical signals are caused to be amplified in succession in the dual-gain amplifier circuit 15 each by a different one of the two possible values of gain of the dual-gain amplifier circuit 15. The two successive amplifying operations of the dual-gain amplifier circuit 15 are initiated by means of successive output conditions produced by the gain switching arrangement 16 during the two successive scanning operations. As a result of the two successive operations of the dual-gain amplifier circuit 15, two successive different sets of amplified output signals are produced by the dual-gain amplifier circuit 15, one of the sets of amplified output signals clearly having an amplitude falling within the dynamic range of the processing circuitry 17 and the other set of amplified output signals, depending on the condition of cleanliness of the label, having an amplitude which may or may not fall within the dynamic range of the processing circuitry 17. Specific circuitry is provided in the processing circuitry 17 is accordance with the present invention for appropriately processing those signals having amplitudes falling within the dynamic range of the processing circuitry 17 and, therefore, representing the desired label information, and for rejecting signals not having amplitudes falling within the dynamic range of the processing circuitry 17.

SCANNING UNIT, GAIN-SWITCHING ARRANGEMENT—FIG. 2

Figure 2:
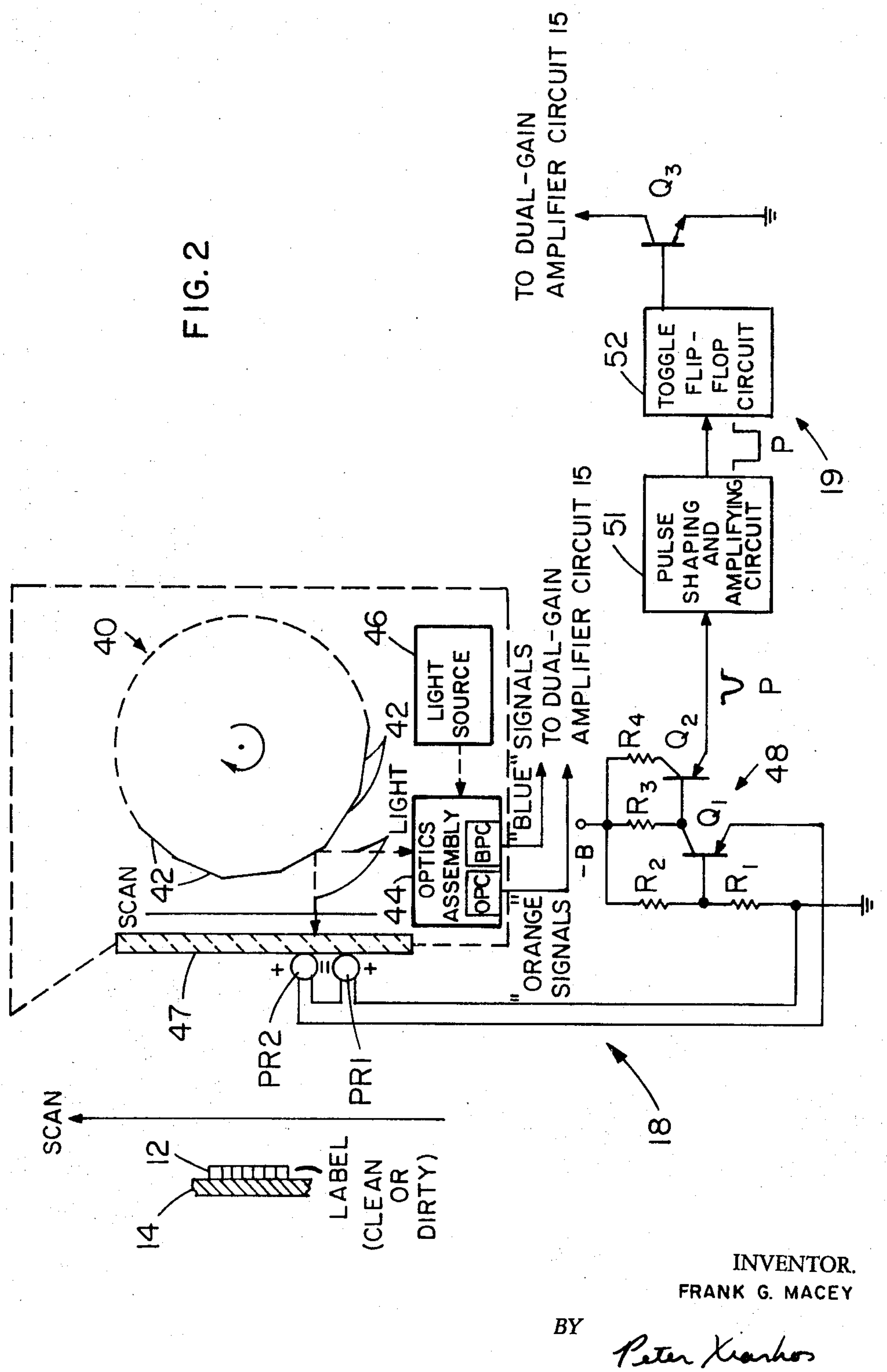
FIG. 2 is a detailed diagrammatic representation of a scanning unit which may be employed in the optical label reading system of FIG. 1 and also of a pulse generating circuit and a gain control circuit employed in the gain switching arrangement in accordance with the present invention.

Referring now to FIG. 2, there is shown a preferred implementation of the scanning unit 10, the pulse generating circuit 18, and the gain control circuit 19.

The scanning unit 10 is preferably of a type such as described in detail in the aforementioned patent to Stites et al. and includes a rotating wheel 40 having a plurality of reflective mirror surfaces 42 on its periphery, an optics assembly 44 including the aforementioned "orange-responsive" photocell OPC and the "blue-responsive" photocell BPC, and a light source 46. By way of example, the rotating wheel 40 may be fourteen inches in diameter, have fifteen reflective mirror surfaces 42 on its periphery, and rotate at 1,200 revolutions per minute.

The pulse generating circuit 18 includes a pair of series-connected photoresponsive devices PR1 and PR2 positioned on a transparent glass or plastic plate 47 associated with the scanning unit 10, and a light detector circuit 48 connected with the photoresponsive devices PR1 and PR2. The photoresponsive devices PR1 and PR2 are positioned on the plate 47 so as to be illuminated at the outset of each scanning beam produced by the scanning unit 10. The two photoresponsive devices PR1 and PR2, which may be solar cells, are connected in series opposition, with the negative terminals being connected together and the positive terminals being connected to the light detector circuit 48. As indicated in FIG. 2, the positive terminal of the photoresponsive device PR1 is connected directly to ground potential, and the positive terminal of the photoresponsive device PR2 is connected directly to the emitter of a PNP switching transistor $Q_1$. The base of the switching transistor $Q_1$ is connected to the juncture of a pair of voltage divider resistors $R_1$ and $R_2$ which are connected between a negative voltage source $-B$ and ground potential. The collector of the switching transistor $Q_1$ is coupled to the negative voltage source $-B$ via a resistor $R_3$ and also directly to the base of a PNP transistor $Q_2$ which is arranged in an emitter-follower configuration. The collector of the transistor $Q_2$ is coupled to the negative voltage source $-B$ via a current-limiting resistor $R_4$.

The gain control circuit 19 comprises, in series with the emitter of the PNP emitter-follower transistor $Q_2$, a pulse shaping and amplifying circuit 51, a toggle flip-flop circuit 52, and an NPN gain control transistor $Q_3$. The base of the gain control transistor $Q_3$ is coupled to an output terminal of the toggle flip-flop circuit 52, the emitter is coupled directly to ground potential, and the collector is coupled to the dual-gain amplifier circuit 15. The operation of the scanning unit 10, the pulse generating circuit 18, and the gain control circuit 19 of FIG. 2 is as follows.

As a vehicle 14 bearing a coded label 12, whether clean or dirty, is presented to the scanning unit 10, light from the light source 46 is initially directed by the optics assembly 44 onto the reflective mirror surfaces 42 of the rotating wheel 40. When a rotation motion is imparted to the rotating wheel 40 (as by a motor, not shown), the light received by the reflective mirror surfaces 42 is directed through the transparent plastic or glass plate 47 onto the label 12. The light directed onto the label 12 is retroreflected by each of the retroreflective stripes of the label 12, as they are successively scanned, along the path of the incident light back toward the scanning unit 10. For reasons stated hereinbefore, the amplitude of the light retroreflected by the label 12 depends on the amount of light-attenuating foreign matter, if any, present on the label 12. The retroreflected light returned by each retroreflective stripe back toward the scanning unit 10 is received by the reflective mirror surfaces 42 of the rotating wheel 40 and directed thereby to the optics assembly 44. In the optics assembly 44, the return light is separated into its "orange" and "blue" components and selectively applied to the orange-responsive and blue-responsive photocells OPC and BPC. As mentioned previously, in response to an orange stripe being scanned, the orange-responsive photocell OPC is operated to produce an electrical output signal ("ORANGE" signal), and in response to a blue stripe being scanned, the blue-responsive photocell BPC is operated to produce an electrical output signal ("-BLUE" signal). In response to a white stripe being scanned, both of the photocells OPC and BPC are operated to produce respective electrical output signals, and in response to a black nonretroreflective stripe being scanned, neither of the photocells OPC AND BPC is operated to produce an output signal. The various electrical output signals selectively produced by the photocells OPC and BPC are applied to the dual-gain amplifier circuit 15 (FIG. 1).

The scanning unit 10 of FIG. 2 has been described hereinabove to the extent necessary to understand the present invention. However, for further or more specific details relating to the components of the scanning unit 10 and their operation, reference may be made to the aforementioned patent to Stites et al.

As the above-described label-scanning operation takes place and, more particularly, at the outset of the scanning beam produced by the scanning unit 10, both of the photoresponsive devices PR1 and PR2 are briefly illuminated in succession by light from one of the reflective mirror surfaces 42 of the rotating wheel 40. As the first photoresponsive device PR1 alone is illuminated, as the scanning beam instantaneously sweeps past the first photoresponsive device PR1, a negative voltage is produced thereacross (that is, the photoresponsive device PR1 acts like a negative battery source), and the potential at the emitter of the PNP switching transistor $Q_1$ becomes sufficiently negative with respect to the base to cause the transistor $Q_1$ to operate in its nonconducting condition. The base-emitter potential of the PNP emitter-follower transistor $Q_2$ accordingly becomes sufficiently negative to be forward-biased into its conducting condition. As a result, a trigger pulse P is initiated at the emitter of the emitter-follower transistor $Q_2$. As the light from the reflective mirror surfaces continues to move past the first and second photoresponsive devices PR1 and PR2, such that both of the photoresponsive devices PR1 and PR2 are now simultaneously illuminated, opposing voltages are produced across the photoresponsive devices PR1 and PR2 (that is, both of the photoresponsive devices PR1 and PR2 act as opposing negative and positive battery sources, respectively) and the opposing voltages cancel out each other. As a result, the transistor $Q_1$ is operated in its conducting condition and the transistor $Q_2$ is operated in its nonconducting condition, and the trigger pulse P at the emitter of the emitter-follower transistor $Q_2$ is terminated.

As the light from the reflective mirror surfaces moves away from the first photoresponsive device PR1, such that only the second photoresponsive device PR2 is now illuminated, a positive voltage is developed across the photoresponsive device PR2. However, this voltage serves only to render the voltage at the emitter of the transistor $Q_1$ more positive with respect to the base and to keep the transistor $Q_1$ in its conducting condition and the transistor $Q_2$ in its nonconducting condition.

The above-mentioned trigger pulse P produced by the light detector circuit 48 is applied to the pulse shaping and amplifying circuit 51 and processed thereby in a conventional fashion to achieve sharp leading and trailing edges for the trigger pulse P and also to achieve the required voltage levels for operating the toggle flip-flop circuit 52. The toggle flip-flop circuit 52, of well-known construction, has two stable operating states and operates in response to the trigger pulse P, after being processed by the pulse shaping and amplifying circuit 51, to switch from one operating state to the other whereby the voltage at the output terminal thereof switches from a first value to a second value, for example, from a low value to a high value or from a high value to a low value. During the next succeeding scanning operation, that is, during the operation of the scanning unit 10 to scan the coded label 12 for the second time, another trigger pulse P is produced by the light detector circuit 48 and, after processing by the pulse shaping and amplifying circuit 51, applied to the toggle flip-flop circuit 52. The toggle flip-flop circuit 52 operates in response to the second trigger pulse P to be switched back to its prior operating state whereby the voltage at the output terminal thereof switches from its second value back to its first value. Thus, the toggle flip-flop circuit 52 is alternately toggled between its two operating states by successive trigger pulses P derived during successive scanning operations.

The gain control transistor $Q_3$, which receives the output voltage produced at the output terminal of the toggle flip-flop circuit 52, similarly has two operating states, a low-impedance conducting state and a high-impedance nonconducting state, and is adapted to be switched between its two operating states in response to the toggle flip-flop circuit 52 being switched between its two operating states during successive scanning operations. More particularly, the NPN gain control transistor $Q_3$ is caused to be forward biased into its low-impedance conducting state when the output voltage of the toggle flip-flop circuit 52 switches from its low value to its high value, and to be reverse biased into its high-impedance nonconducting state when the output voltage of the toggle flip-flop circuit 52 switches from its high value to its low value.

The dual-gain amplifier circuit 15, which is connected to the collector of the gain control transistor $Q_3$, operates in response to successive operations of the gain control transistor $Q_3$ during successive scanning operations to switch between its two values of gain whereby signals received from the scanning unit 10 during one scanning operation are amplified by one of the two values of gain of the dual-gain amplifier circuit 15 and signals received from the scanning unit 10 during the next successive scanning operation are amplified by the other of the two values of gain of the dual-gain amplifier circuit 15.

DUAL-GAIN AMPLIFIER CIRCUIT 15—FIG. 3

Figure 3:
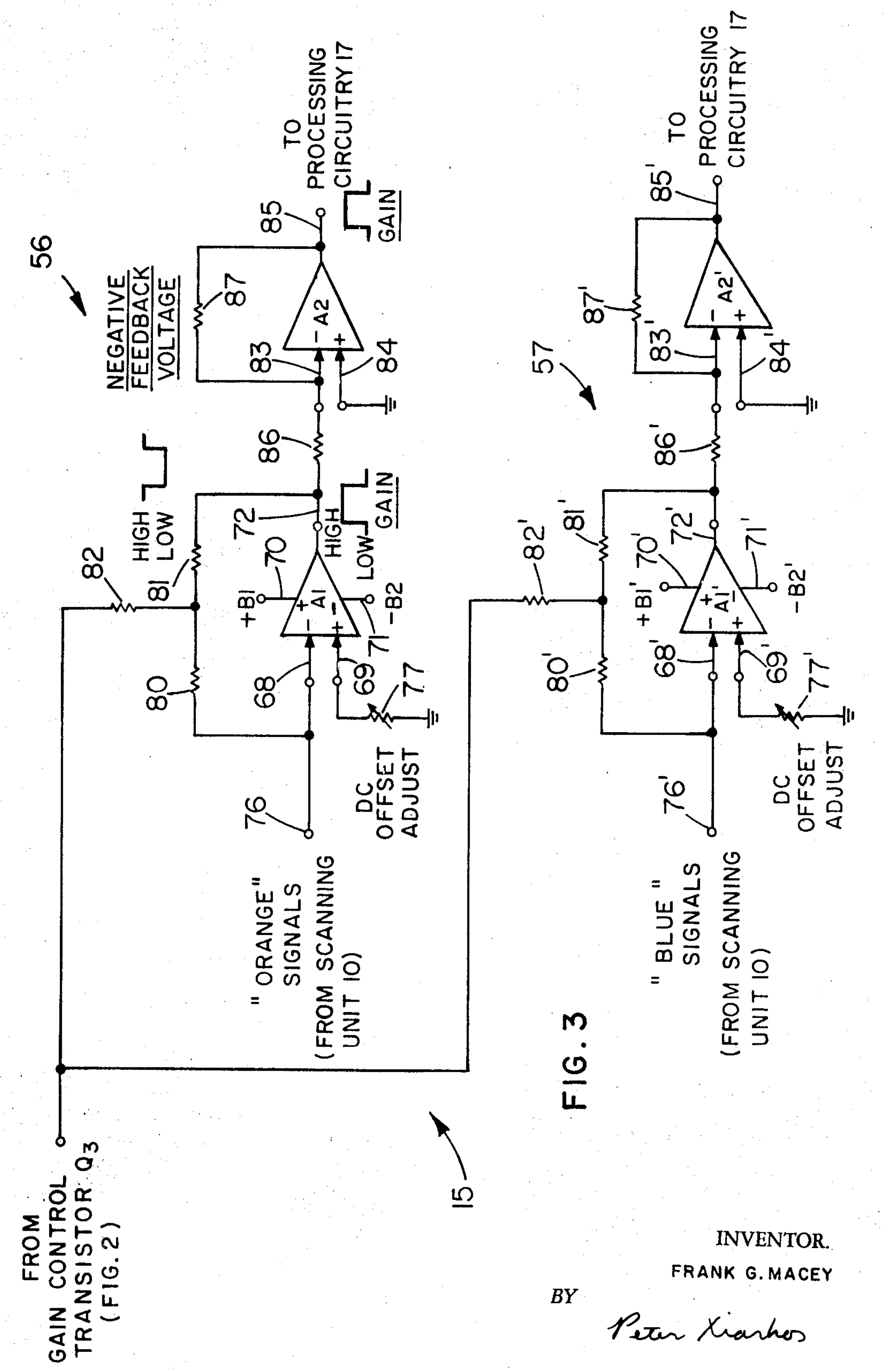
FIG. 3 is a detailed diagrammatic representation of a preferred form of the dual-gain amplifier circuit.

Although the dual-gain amplifier circuit 15 may assume a variety of forms well known to those skilled in the art, a particularly suitable and preferred form of the dual-gain amplifier circuit 15 is shown in FIG. 3. As shown in FIG. 3, the dual-gain amplifier circuit 15 includes a first amplifier circuit 56 for processing "ORANGE" signals produced by the scanning unit 10 as a result of scanning orange and white stripes of a label 12, and a second amplifier circuit 57 for processing "BLUE" signals produced by the scanning unit 10 as a result of scanning blue and white stripes of a label 12. Since the first and second amplifier circuits 56 and 57 are of the same construction and operate in the same manner, only the first amplifier circuit 56 will be described in detail herein. For this reason, primed reference numerals are employed in FIG. 3 to identify the various elements comprising the second amplifier circuit 57.

The amplifier circuit 56 includes a pair of linear differential amplifiers A1 and A2. The linear differential amplifier A1, which may be one of several well-known commercially available operational amplifiers, includes, in a conventional fashion, an inverting input terminal 68, a noninverting input terminal 69, a positive bias terminal 70, a negative bias terminal 71, and an output terminal 72. The inverting input terminal 68 of the linear differential amplifier A1 is coupled to an input terminal 76 which receives the various "ORANGE" output signals produced by the scanning unit 10. The noninverting input terminal 69 is coupled to a variable DC offset adjust resistor 77 which is adjusted to prevent any DC voltage which may be present in signals received at the input terminal 76 of the amplifier circuit 56 and applied to the inverting input terminal 68 of the linear differential amplifier A1 from appearing at the output terminal 72 and adversely affecting the operation of the linear differential amplifier A2. The positive bias terminal 70 of the linear differential amplifier A1 is connected to a positive DC voltage source +B1, and the negative bias terminal 71 is connected to a negative DC voltage source −B2. In addition to the above circuit connections, a pair of series voltage-divider resistors 80 and 81 is connected between the inverting input terminal 68 and the output terminal 72 for establishing a negative-feedback voltage path between the output terminal 72 and the inverting input terminal 68. An input resistor 82 is also provided between the collector of the gain control transistor $Q_3$ (FIG. 2) and the juncture of the voltage divider resistors 80 and 81 for fixing the values of gain of the differential linear amplifier A1 when the gain control transistor $Q_3$ is operating in its low-impedance and high-impedance conditions.

The linear differential amplifier A2, which may be of the same type as the linear differential amplifier A1, includes an inverting input terminal 83, a noninverting input terminal 84, and an output terminal 85. The inverting input terminal 83 of the linear differential amplifier A2 is coupled via a coupling resistor 86 to the output terminal 72 of the linear differential amplifier A1, and the noninverting input terminal 84 is connected directly to ground potential. A negative feedback resistor 87 is also provided between the inverting input terminal 83 and the output terminal 85 for establishing the desired value of gain for the linear differential amplifier A2.

In the operation of the above-described amplifier circuit 56, as the gain control transistor $Q_3$ (FIG. 2) switches between its high-impedance nonconducting condition and its low-impedance conducting condition, during successive scanning operations, the negative feedback voltage of the linear differential amplifier A1 present at the juncture of the voltage-divider resistors 80 and 81 switches between two possible values. More specifically, as the gain control transistor $Q_3$ switches from its high-impedance condition to its low-impedance condition during a particular scanning operation, the negative feedback voltage present at the juncture of the voltage-divider resistors 80 and 81 switches from a high value to a low value. As a result, the gain of the linear differential amplifier A1 switches from a low value to a high value and "ORANGE" signals applied to the inverting input terminal 68 of the linear differential amplifier A1 during the particular scanning operation are inverted and amplified by the linear differential amplifier A1 by the high value of gain. As the gain control transistor $Q_3$ switches from its low-impedance condition to its high-impedance condition, during the next successive scanning operation, the negative feedback voltage present at the juncture of the voltage-divider resistors 80 and 81 switches from its low value back to its high value. As a result, the gain of the linear differential amplifier A2 switches from its high value back to its low value and "ORANGE" signals applied to the inverting input terminal 68 of the linear differential amplifier A1 are inverted and amplified by the linear differential amplifier A1 by the low value of gain.

The various signals produced at the output terminal of the linear differential amplifier A1 during successive scanning operations are coupled via the coupling resistor 86 to the inverting input terminal 83 of the linear differential amplifier A2, inverted and amplified thereby a fixed value of gain, and applied to the output terminal 85. The signals at the output terminal 85 of the linear differential amplifier A1 are then applied to the processing circuitry 17 for further processing.

PROCESSING CIRCUITRY 17—FIG. 4

Figure 4:
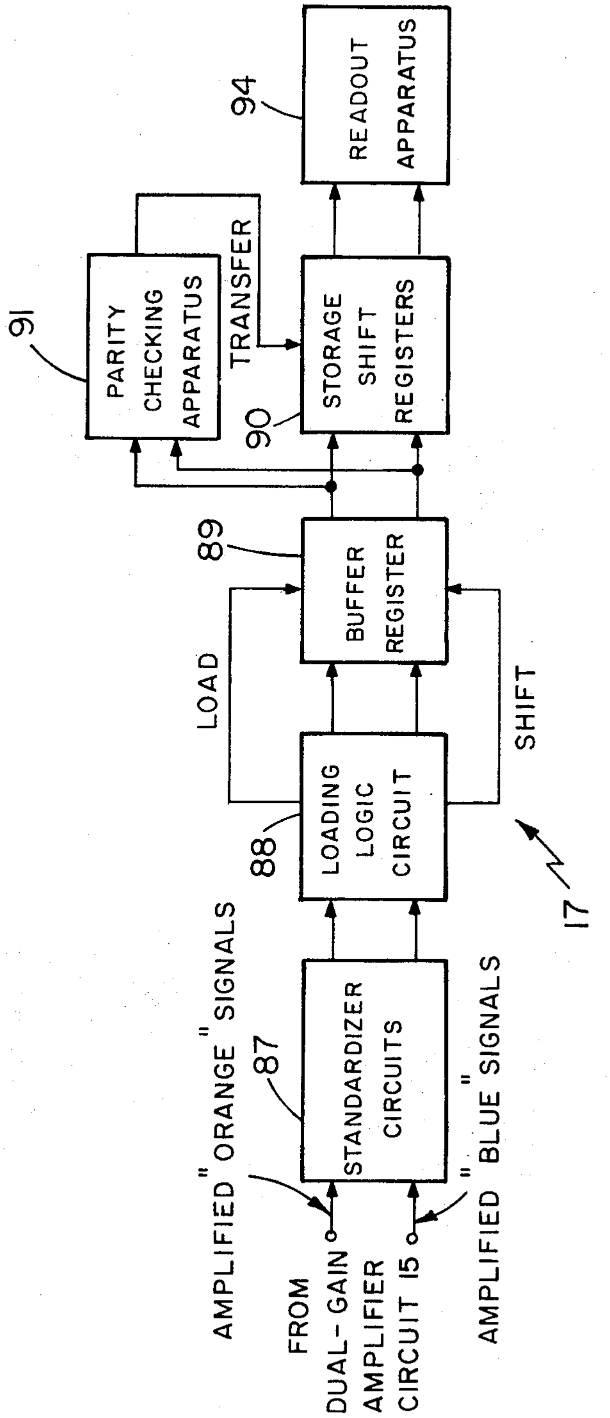
FIG. 4 is a diagrammatic representation of processing circuitry which may be employed in the optical label reading system of FIG. 1.

The processing circuitry 17 of FIG. 1 is shown in greater detail in FIG. 4. As shown therein, the processing circuitry 17 comprises standardizer circuits 87, a loading logic circuit 88, a buffer register 89, storage shift registers 90, a parity checking apparatus 91, and a readout apparatus 94.

In the operation of the processing circuitry 17, the various amplified "ORANGE" and "BLUE" output signals produced by the dual-gain amplifier circuit 15 during a particular scanning operation are applied to the standardizer circuits 87. The standardizer circuits 87, a suitable and preferred implementation of which is described in detail in U.S. Pat. No. 3,299,271, to Stites, assigned to the same assignee as the present application, operate to measure the widths of the signals received thereby at the half-amplitude points and to convert the signals measured at the half-amplitude points into pulses each having a uniform, standardized amplitude. The various standardized output pulses produced by the standardizer circuits 87 during a scanning operation are applied to the loading logic circuit 88. A suitable and preferred implementation of the loading logic circuit 88 is described in detail in a copending patent application of Kapsambelis et al., Ser. No. 865,661, filed Oct. 13, 1969, entitled "Signal Processing System," and assigned to the same assignee as the present application.

The loading logic circuit 88 operates in response to the various standardized output pulses produced by the standardizer circuits 87 during a scanning operation to load the pulses into the buffer register 89, for temporary storage therein, and also to determine whether the pulses satisfy certain preestablished pulse-width and pulse-timing criteria for valid label-derived pulses. If the standardized output pulses received by the loading logic circuit 88 and loaded into the buffer register 89 during a particular scanning operation satisfy the above-mentioned pulse-width and pulse-timing criteria, they are shifted out of the buffer register 89 and into the storage registers 90 and stored therein.

In the above connection, it is to be noted that when amplified "ORANGE" and "BLUE" output signals are produced by the dual-gain amplifier circuit 15 either as a result of amplifying signals derived from a "clean" label by the corresponding first (smaller) value of gain, or as a result of amplifying signals derived from a "dirty" label by the corresponding second (larger) value of gain, the resulting amplitude of these amplified "ORANGE" and "BLUE" signals fall within the dynamic range of the standardizer circuits 87 and cause standardized output pulses to be produced by the standardizer circuits 87 having pulse widths and timing values which, in nearly all cases, satisfy the pulse-timing and pulse-width criteria of the loading logic circuitry. Accordingly, these standardized output pulses are properly applied by the loading logic circuit 88 (via the buffer register 89) to the storage shift registers 90. However, when amplified "ORANGE" and "BLUE" output signals are produced by the dual-gain amplifier circuit 15 either as a result of amplifying signals derived from a "clean" label by the second (smaller) value of gain, or as a result of amplifying signals derived from a "dirty" label by the first (larger) value of gain, as previously discussed, the resulting amplitudes of these amplified signals may or may not fall within the dynamic range of the standardizer circuits 87, as determined by the condition of cleanliness of the label. If the amplitudes of these signals do fall within the dynamic range of the standardizer circuits 87, standardized pulses are produced by the standardizer circuits 87 and processed by the loading logic circuit 88 in the same manner as described above. If they do not, either no standardized output pulses are produced by the standardizer circuits 87 or standardized output pulses are caused to be produced by the standardizer circuits 87 including one or more pulses having width and/or timing values generally failing to satisfy the aforementioned pulse-width and pulse-timing criteria of the loading logic circuit 88. In the latter case, the standardized pulses produced by the standardizer circuits 87 are prevented by the loading logic circuit 88 from being applied to the storage shift registers 90. Suitable implementations of the buffer register 89 and the storage shift registers 90 are disclosed in detail in the aforementioned patent to Stites et al. and also in the aforementioned application of Kapsambelis et al.

The various signals applied to the storage shift registers 90 as a result of scanning a given label ("clean" or "dirty") and corresponding to the information encoded in the label, that is, the START control word, the code digits $a_0...a_9$, the STOP control word, and the parity check integer $R_C$, are also applied to the parity checking apparatus 91. A suitable and preferred implementation of the parity checking apparatus A1 is disclosed in the aforementioned patent to Weiss. The parity-checking apparatus 91 operates to perform various mathematical operations on the signals received thereby corresponding to the code digits $a_0...a_9$ to calculate the value of the parity check integer corresponding to the values of these signals (in accordance with the aforementioned "powers-of-two-modulo-11" system of parity). The calculated value of parity is then compared with the value of the signal corresponding to the parity check integer $R_C$ encoded in the label. If the two values are the same, thereby indicating that the signals stored in the storage shift registers 90 satisfy system parity requirements and pertain to valid label data, a transfer signal is produced by the parity checking apparatus 91 and applied to the storage shift registers 90 to cause the signals stored in the storage shift registers 90 to be applied to the readout apparatus 94. If the two compared values are not the same, as occurs, for example, for signals satisfying the pulse-width and pulse-timing criteria of the loading logic circuit 88 but representing information differing from the information encoded in the label, no transfer signal is produced by the parity checking apparatus 91 and applied to the storage shift registers 90. Accordingly, the signals stored in the storage shift registers 90 are not applied to the readout apparatus 94. The readout apparatus 88 typically includes local or remote computer, display, or printout apparatus.

While there has been shown and described what is considered to be a preferred embodiment of the present invention, it will be obvious to those skilled in the art that various changes and modifications may be made therein without departing from the invention as defined in the appended claims.

What is claimed is:

1. A system for processing information encoded in a label, comprising:

information-sensing means operative to sense the information encoded in the label and to produce output signals representative thereof;

control means operative to amplify the output signals produced by the information-sensing means by a first value of gain corresponding to a predetermined first condition of cleanliness of a label or by a second value of gain corresponding to a predetermined second condition of cleanliness of a label thereby to produce amplified output signals therefrom of a first amplitude or a second amplitude; and signal-processing means for examining the amplified output signals of the first amplitude or the second amplitude produced by the control means to determine whether said signals satisfy certain preestablished criteria for valid label-derived signals, and operative to produce and apply output signals related to said amplified output signals of the first amplitude or second amplitude to an output connection if said amplified output signals satisfy the preestablished criteria.

2. A system in accordance with claim 1 wherein:

the label is a radiation-reflecting label; and the information-sensing means comprises:

scanning means for scanning the radiation-reflecting label with an incident beam of electromagnetic radiation; and means arranged to receive electromagnetic radiation reflected from the radiation-reflecting label and operative in response to electromagnetic radiation received after reflection from the radiation-reflecting label to produce output signals representative of the information encoded in the radiation-reflecting label.

3. A system in accordance with claim 2 wherein:

the radiation-reflecting label is a retroreflective label; and the electromagnetic radiation is visible light.

4. A system in accordance with claim 1 wherein the control means comprises:

dual-gain amplifier circuit means coupled to the information-sensing means and adapted to receive the output signals produced by the information-sensing means, said dual-gain amplifier circuit means having a control connection and a first value of gain and a second value of gain, said dual-gain amplifier circuit means being operative in response to a predetermined condition at the control connection thereof to amplify signals received from the information-sensing means by the first value of gain or by the second value of gain; and circuit means coupled to the information-sensing means and to the control connection of the dual-gain amplifier circuit means and operative during the operation of the information-sensing means to produce an output condition at the control connection of the dual-gain amplifier circuit means for causing the dual-gain amplifier circuit means to amplify the output signals produced by the information-sensing means by either the first value of gain or the second value of gain.

5. A system in accordance with claim 4 wherein the circuit means comprises:

pulse-generating circuit means coupled to the information-sensing means and operative to generate an output pulse during the operation of the information-sensing means; and gain control circuit means operative to receive the output pulse generated by the pulse-generating circuit means and in response thereto to produce a first output impedance condition or a second output impedance condition at the control connection of the dual-gain amplifier circuit means, the first output impedance condition causing the dual-gain amplifier circuit means to amplify output signals produced by the information-sensing means by the first value of gain and the second output impedance condition causing the dual-gain amplifier circuit means to amplify output signals produced by the information-sensing means by the second value of gain.

6. A system in accordance with claim 5 wherein the gain control circuit means comprises:

first circuit means coupled to the pulse-generating circuit means and adapted to receive the output pulse generated by the pulse generating circuit means, said first circuit means being operable in response to the output pulse generated by the pulse generating circuit means to produce a first output voltage condition or a second output voltage condition; and impedance means coupled to the first circuit means and having a first operating condition during which it has a first value of impedance and a second operating condition during which it has a second value of impedance, said impedance means being responsive to the first output voltage condition of the first circuit means to operate in its first operating condition and to have its first value of impedance and responsive to the second output voltage condition of the first circuit means to operate in its second operating condition and to have its second value of impedance.

7. A system in accordance with claim 6 wherein:

the first circuit means includes a flip-flop circuit; and the impedance means includes a transistor coupled to the flip-flop circuit.

8. A system in accordance with claim 7 wherein:

the label is a radiation-reflecting label; and the information-sensing means comprises:

scanning means for scanning the radiation-reflecting label with an incident beam of electromagnetic radiation; and means arranged to receive electromagnetic radiation reflected from the radiation-reflecting label and operative in response to electromagnetic radiation received after reflection from the radiation-reflecting label to produce output signals representative of the information encoded in the radiation-reflecting label.

9. A system in accordance with claim 8 wherein the pulse-generating circuit means comprises:

radiation-responsive means positioned with respect to the scanning means so as to be exposed to electromagnetic radiation from the scanning means during the operation of the scanning means; and detector circuit means coupled to the radiation-responsive means and operable in response to the radiation-responsive means being exposed to electromagnetic radiation from the scanning means to produce an output pulse.

10. A system in accordance with claim 9 wherein the radiation-reflecting label is a retroreflective label and the electromagnetic radiation is visible light.

11. A system in accordance with claim 1 wherein the signal-processing means comprises:

standardizer circuit means for receiving the amplified output signals of the first amplitude or the second amplitude produced by the control means and operative to measure the widths at predetermined points of the amplified output signals and to produce output signals the widths of which correspond to the widths of the corresponding amplified output signals;

storage means for storing signals; and logic circuit means coupled to the standardizer circuit means and to the storage means and adapted to examine the output signals produced by the standardizer circuit means to determine whether said output signals satisfy certain preestablished signal-width and signal-timing criteria for valid label-derived signals, and operative to apply said output signals to the storage means if said output signals satisfy the preestablished signal-width and signal-timing criteria.

12. A system in accordance with claim 11 wherein:

the information encoded in the label includes parity information; and the signal-processing means further comprises:

parity-checking means coupled to the storage means for determining whether the signals applied to and stored in the storage means satisfy system parity requirements as established by a predetermined system of parity calculation, and operable to apply the signals stored in the storage means to an output connection if the signals satisfy the system parity requirements.

13. A system for processing information encoded in a label, comprising:

acquisition means adapted to acquire from the label two sets of signals representative of the information encoded in the label;

control means operative to amplify one of the two sets of signals by a first value of gain corresponding to a predetermined first condition of cleanliness of a label and to amplify the other of the two sets of signals by a second value of gain corresponding to a predetermined second condition of cleanliness of a label thereby to produce two sets of amplified output signals therefrom; and signal-processing means for receiving and examining the two sets of amplified output signals produced by the control means to determine whether the sets of signals satisfy certain preestablished criteria for valid label-derived signals, and operative in response to each of the sets of amplified output signals to produce and apply output signals related thereto to an output connection if the set of amplified output signals satisfies the preestablished criteria.

14. A system for processing information encoded in a label, comprising:

information-sensing means operative to sense twice, in succession, the information encoded in the label and to produce two successive sets of output signals representative of the information encoded in the label;

control means operative to amplify in succession the two sets of output signals produced by the information-sensing means, one of the two sets of output signals being amplified by a first value of gain corresponding to a predetermined first condition of cleanliness of a label, thereby to produce a first set of amplified output signals, and the other of the two sets of output signals being amplified by a second value of gain corresponding to a predetermined second condition of cleanliness of a label, thereby to produce a second set of amplified output signals; and signal-processing means for examining in succession the first and second sets of amplified output signals produced by the control means to determine whether the first and second sets of signals satisfy certain preestablished criteria for valid label-derived signals, and operative in response to each of the sets of amplified output signals to produce and apply output signals related thereto to an output connection if the set of amplified output signals satisfies the preestablished criteria.

15. A system in accordance with claim 14 wherein:

the label is a radiation-reflecting label; and the information-sensing means comprises:

scanning means operative to scan the radiation-reflecting label with two successive incident beams of electromagnetic radiation; and means arranged to receive electromagnetic radiation reflected from the radiation-reflecting label during each of the two successive scanning operations of the scanning means and operable in response to electromagnetic radiation received after reflection from the radiation-reflecting label to produce output signals representative of the information encoded in the radiation-reflecting label.

16. A system in accordance with claim 15 wherein:

the radiation-reflecting label is a retroreflective label; and the electromagnetic radiation is visible light.

17. A system in accordance with claim 14 wherein the control means comprises:

dual-gain amplifier circuit means coupled to the information-sensing means and adapted to receive in succession the two sets of output signals produced by the information-sensing means, said dual-gain amplifier circuit means having a first value of gain and a second value of gain; and circuit means coupled to the information-sensing means and to the dual-gain amplifier circuit means and operative during the two successive operations of the information-sensing means to produce two successive output conditions for causing the dual-gain amplifier circuit means to amplify in succession the two sets of output signals, each by a different one of the first and second values of gain of the dual-gain amplifier circuit means.

18. A system in accordance with claim 17 wherein the circuit means comprises:

pulse--generating circuit means coupled to the information-sensing means and operative to generate two successive output pulses during the two successive operations of the information-sensing means; and gain control circuit means operative to receive in succession the two output pulses produced by the pulse-generating circuit means and in response thereto to produce two successive output impedance conditions, one of the output impedance conditions causing the dual-gain amplifier circuit means to amplify one of the two sets of output signals produced by the information-sensing means by one of the first and second values of gain and the other output impedance condition causing the dual-gain amplifier circuit means to amplify the other of the two sets of output signals produced by the information-sensing means by the other of the first and second values of gain.

19. A system in accordance with claim 18 wherein:

the label is a radiation-reflecting label;

the information-sensing means comprises:

scanning means operative to scan the radiation-reflecting label with two successive incident beams of electromagnetic radiation; and means arranged to receive electromagnetic radiation reflected from the radiation-reflecting label during each of the two successive scanning operations of the scanning means and operative in response to electromagnetic radiation received after reflection from the radiation-reflecting label to produce output signals representative of the information encoded in the radiation-reflecting label;

the pulse-generating circuit means comprises:

radiation-responsive means positioned with respect to the scanning means so as to be exposed to electromagnetic radiation from the scanning means during each of the two successive operations of the scanning means; and detector circuit means coupled to the radiation-responsive means and operable in response to the radiation-responsive means being exposed to electromagnetic radiation during the two successive operations of the scanning means to produce two successive output pulses; and the gain control circuit means comprises:

first circuit means coupled to the detector circuit means and adapted to receive the two successive output pulses generated by the detector circuit means, said first circuit means being operable in response to the two successive output pulses produced by the detector circuit means to produce two successive output voltage conditions; and impedance means coupled to the first circuit means and having a first operating condition during which it has a first value of impedance and a second operating condition during which it has a second value of impedance, said impedance means being responsive to the first one of the two successive output voltage conditions of the first circuit means to operate in one of its two operating conditions and responsive to the other of the two successive output voltage conditions of the first circuit means to operate in the other of its two operating conditions.

20. A system in accordance with claim 14 wherein:

the information encoded in the label includes parity information; and the signal-processing means comprises:

standardizer circuit means for receiving the first and second sets of amplified output signals produced by the control means and operative to measure the widths at predetermined points of the amplified output signals and to produce output signals the widths of which correspond to the widths of the corresponding amplified output signals;

storage means for storing signals;

logic circuit means coupled to the standardizer circuit means and to the storage means and adapted to examine the output signals produced by the standardizer circuit means to determine whether said output signals satisfy certain preestablished signal-width and signal-timing criteria for valid label-derived signals, and operative to apply said output signals to the storage means if said output signals satisfy the preestablished signal-width and signal-timing criteria; and parity-checking means coupled to the storage means for determining whether the signals applied to and stored in the storage means satisfy system parity requirements as established by a predetermined system of parity calculation, and operable to apply the signals stored in the storage means to an output connection if the signals satisfy the system parity requirements.

* * * * *